United States Patent Office 3,337,965
Patented Aug. 29, 1967

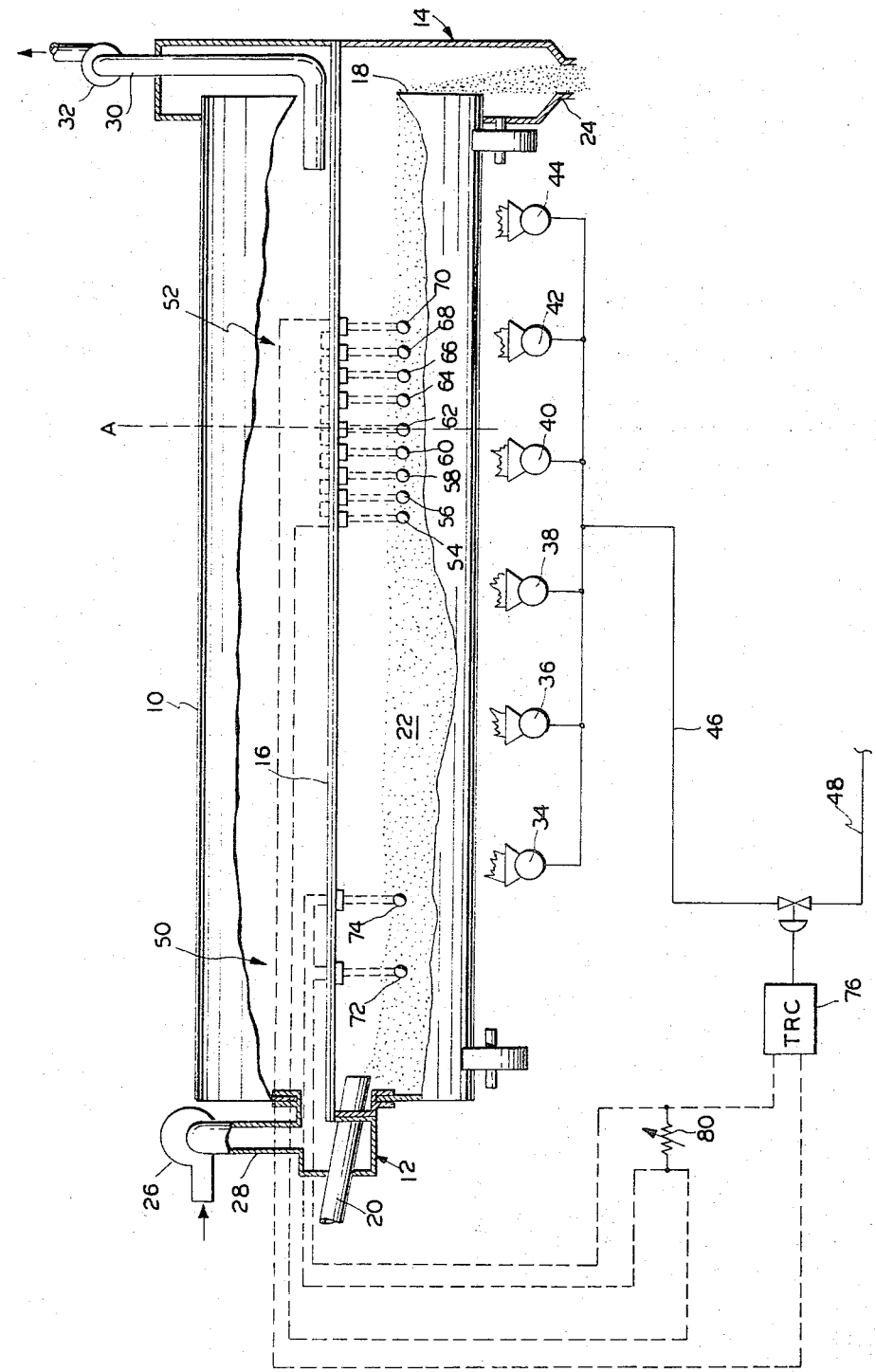

3,337,965
TEMPERATURE CONTROL SYSTEM FOR
ROTARY DRYERS
Travis S. Whitsel, Jr., Houston, Tex., assignor to Ashland
Oil & Refining Company, Houston, Tex., a corporation
of Kentucky
Filed July 12, 1965, Ser. No. 470,961
18 Claims. (Cl. 34—39)

More recently, a method and apparatus, to control the temperature of the dryer more adequately, has been set forth in co-pending application, Ser. No. 155,026, filed Nov. 27, 1961, now Patent No. 3,204,341, by the present inventor and entitled, "Temperature Control System for Rotary Dryers." The present application is a continuation-in-part of said application.

The present invention relates to a method and apparatus for control of the temperature of a drying system. In a more specific aspect, the present invention relates to a temperature control system for use in a rotary dryer wherein granular materials, such as carbon black pellets are dried.

Rotary dryers are well known for the drying of granular material and particularly in the drying of carbon black. In the manufacture of carbon black powdery carbon black is agglomerated into small pellets to reduce dust problems and facilitate handling. A widely practiced method for making pellets involves mixing the dry powdery carbon black with about half its weight of water. Proper agitation results in the formation of lead-shot-size wet pellets which must be dried to a moisture content of roughly 0.1 to 1.0% before they can be economically packaged and shipped. Carbon black manufacturers customarily treat a continuous stream of such wet pellets in a variety of drying systems. The type of dryer that has been the most popular for some years is the rotary dryer which somewhat resembles a rotary cement kiln.

The most common type of rotary dryer has a drum defining a chamber through which the wet pellets flow as the drum rotates. The drum is generally inclined somewhat so that the tumbling pellets flow from the inlet or upstream end toward the outlet or downstream end and overflow over a dyke or barrier at the downstream end. Burners, usually gas fired, direct hot combustion gases against the exterior of the drum and heat the flowing bed of pellets indirectly. It is also customary to introduce hot purge gases or hot combustion gases through the space in the drum above the bed of wet pellets to remove the water vapor as it is evaporated from the pellets.

One of the usual methods of controlling the firing of a rotary dryer is to determine the outlet product temperature and to regulate the fuel supply from a common fuel supply line to all of the burners in proportion to that temperature. Since the dryer usually demands more heat at the inlet end, this demand is usually filled by placing more burners at the feed inlet end. This method of control is far from satisfactory since the temperature sensed at the outlet end is obtained after a substantial time lag equal to the time required for the granular material to traverse the entire length of the dryer. In addition, the pellets do not flow through the dryer in the same distinct bodies or slugs as they were introduced but spread out through a considerable length dryer. Accordingly, there is little or no adequate control of the temperature with one direct such temperature only as an afterthought at the end of the dryer. The obvious defect of this type of control becomes much more prevalent when attempts are made to control the heat required at the inlet end where the vast majority of the drying takes place, and particularly when the moisture content of the pellets increase substantially over normal feed materials.

In addition to the temperature measuring instrument at the outlet end of the dryer attempts have also been made to control the temperature at the inlet end of the dryer by measuring the moisture content or the rate of water input to the dryer. In actual practice, this is usually a manual control adjusted by the operator in conformance with variations in the water input to the mixers which precede the dryer. There is considerable validity to a control such as this since the B.t.u. input is varied in conformity with the water input. However, as used in present day dryers, it regulates the B.t.u. input throughout the whole dryer. Actually, it should govern only the input in the very front portion of the dryer, where over 90% of the water is evaporated from the pellets.

In accordance with the subject co-pending application, applicant became aware of the fact that the drying of pellets goes through three phases marked by certain temperature phenomena and drying kinetics, which will now be explained. In the first phase, the pellets just charged into the dryer begin to heat up from ambient temperature toward a substantially constant temperature. The attainment of the constant temperature marks the beginning of the second phase, which is referred to as the "constant rate period." The pellets must travel a certain average distance through the dryer and, as a consequence, absorb a certain minimum amount of heat before attaining the aforesaid constant temperature which marks the beginning of the constant rate period. During the constant rate period, water is evaporated from the surface of the pellets and the rate of diffusion of the water to the surface of the pellet is equal to or greater than the rate of evaporation. Accordingly, the temperature of the pellet surface will not exceed the dew point of the atmosphere surrounding the pellets or the temperature at which the water is evaporating. Eventually, there comes a point of time in a drying process when the rate of diffusion of the water to the surface of the pellet is less than the rate of evaporation. This is the beginning of what is termed the "falling rate period." As the moisture content continues to decrease, so does the rate of diffusion; consequently the rate of evaporation decreases in proportion. The lack of adequate moisture to saturate the surface of the pellet allows the pellet temperature to increase from the surface inwardly and to thereby dry in the process. Finally, a point is reached at which evaporation takes place to bone dryness, wherein the last molecule of water is evaporated from the interior of the pellet. This falling rate period is therefore marked by a substantial increase in the temperature surrounding the pellets and thus in the pellet bed. Accordingly, if one measures the temperature throughout the length of the dryer the temperature will sharply increase from ambient temperature up to the dew point temperature. The temperature will then remain at substantially the dew point temperature until the rate of evaporation exceeds the rate of diffusion through the pellets. At this point another sharp temperature rise takes place, in a substantially linear fashion, until the maximum outlet temperature is reached, at which point the pellets are dried to the previously mentioned moisture content.

In accordance with the said prior application, it was determined that the point of inflection of the dryer temperature curve or the point where the evaporation rate changes from a constant rate to a falling rate is the critical point for the control of heat to the dryer and best results can be obtained by measuring the temperature and determining the location of this point. In short, by spanning this point, or the predetermined section of dryer length in which this inflection is expected, with temperature measuring devices and utilizing the detected information for controlling fuel to the burners, the point at which the deflection took place could be maintained essentially constant and the dryer adequately controlled.

More specifically, in the system of the prior patent application, a plurality of thermocouples or thermocouple junctions are spaced in and along the dryer over a distance sufficient to cover the contemplated span or length of the dryer within which the temperature inflection point or change from constant to falling evaporation rate occurs. These thermocouples are equally spaced from one another within this range if more than two are employed. The thermocouples are connected to one another in series addition so that a total voltage is measured by an external temperature recorder controller. This total temperature will of course vary with the position of the inflection point or temperature change. For example, if the inflection point is closer to the upstream or inlet end, than desired, the measured voltage will increase over a predetermined value, whereas, if this point has shifted toward the downstream or outlet end, the total voltage measured for all of the thermocouples decreases. Accordingly, by connecting the temperature recorder controller to a valve at the inlet of the burners the flow of fuel to the burners can be adjusted to thereby increase or decrease the temperature as dictated by the measurements made. While this system provides a substantial improvement over the prior art in the control of dryer temperatures, it is not completely adequate and leaves a great deal to be desired. Accordingly, additional experimental evidence has shown that this temperature control alone is not wholly adequate and must be supplemented. More specifically, it was found that not only control at the point of this inflection was necessary but also that control during the falling rate period or period of temperature increase is also necessary. In addition, it was found that simply totalling the measured voltages of the plurality of thermocouples did not adequately locate and represent the maximum voltage variation in the range spanned by the thermocouples.

It is therefore an object of the present invention to provide an improved method and apparatus for temperature control in a rotary dryer. A further object of the present invention is to provide an improved method and apparatus for temperature control in a rotary dryer utilized in the drying of carbon black pellets. A still further object of the present invention is to provide an improved method and apparatus for control of the temperature in a rotary dryer, wherein the temperature is sensed at the point at which a constant rate of evaporation from a particle-form solid rapidly changes to a falling rate of evaporation and the temperature at at least one second point adjacent the inlet end of the dryer. Yet another object of the present invention is to provide an improved method and apparatus for controlling the temperature in a rotary dryer wherein the temperature in a rotary dryer is sensed at the inlet end of the dryer and at the point where a constant rate of evaporation of water from the pellet-form material rapidly changes to a falling rate and these two temperatures are added to one another. A still further object of the present invention is to provide an improved method and apparatus for control of the temperature in a rotary dryer, wherein the temperature is sensed at the inlet end of the dryer and also at the point where a constant rate of evaporation changes to a rapidly declining rate of evaporation; and these two temperatures are added together and variations of the sum from a predetermined normal additive temperature are utilized to control a valve supplying fuel to the heaters of the dryer. Another and further object of the present invention is to provide an improved method and apparatus for control of the heat to a dryer of the rotary-type, wherein the temperature is sensed by a pair of thermocouples located adjacent the inlet end of the dryer to obtain a differential temperature over the distance spanned by the thermocouples; the temperature at the point where a constant rate of evaporation changes to a rapidly falling rate of evaporation is also sensed by at least two thermocouples connected in series addition and spanning such point is also measured; and the two temperatures are added, whereby the heat supplied to the dryer is automatically controlled in accordance with variations of the combined temperature from a predetermined combined temperature. These and other objects and advantages of the present invention will be apparent from the detailed description when read in conjunction with the drawing which shows schematically a dryer of the rotary drum type together with the control system of the present invention.

Surprisingly, it has been discovered in accordance with the present invention that the above objectives can be obtained by determining the temperature and the point at which a constant rate of evaporation changes to a rapidly falling rate of evaporation by a temperature sensing means spanning this point and the temperature at a predetermined point in advance of the said point by a second sensing means, mounted adjacent the inlet end of the dryer and connected in series opposition to the first means, whereby the additive effect of the first-mentioned thermocouple measurement and the second thermocouple measurement can be utilized to control the heat supply to the dryer.

Specifically, as will be pointed out in greater detail hereinafter, if a plurality of thermocouples are spread along a predetermined length of the dryer at a location where a constant rate of evaporation, and thus a constant temperature, is expected to rapidly change to a falling rate of evaporation, and hence an increasing temperature, this determined temperature and the point at which it occurs can be controlled by automatically adjusting the heat supplied to the dryer. If, for example, this point of rapid change shifts to the left or toward the inlet end of the dryer, this can be remedied by adding heat to the dryer; whereas, if the break in the temperature curve has shifted to the right or toward the discharge end of the dryer, it can be shifted back to its normal position and to its normal temperature by reducing the heat to the dryer. If the temperature measured by this method of sensing the temperature is added to the temperature sensed at the inlet end of the dryer, one can determine when an increased throughput or some other change in operation or of the material fed to the dryer occurs, and the dryer can be preliminarily adjusted in accordance with changes which the inlet end temperature makes in the total temperature. In one variation or modification of the invention, the temperature measurement at the inlet end is made by a pair of thermocouples spaced a predetermined distance apart and connected in series opposition to one another to obtain a measurement of the differential temperature between the two points. This differential temperature is then added to the temperature measured at the temperature break point.

The details of the method and apparatus of the present invention will now be explained with reference to the drawing. In accordance with the drawing the dryer comprises a rotatable drum 10 having an inlet or upstream end 12, and a discharge or downstream end 14. Drum 10 is, for example, 5½ to 7 feet in diameter and 52 to 60 feet in length. The rotary drum is mounted to rotate about shaft 16 and inlet end 12 and within discharge end 14 of the dryer system. As previously indicated, the dryer shell or drum is generally inclined slightly from the inlet end to the discharge end so that while the drum is rotating the pelletized carbon black will flow toward the discharge end and eventually overflow over the dyke formed by the interior edge 18 of the end of the drum. The pipe 20 introduces wet carbon black pellets from a suitable source, not shown, to the dryer where these pellets form a body of pellets 22 flowing along the length of the dryer and eventually overflowing over dyke 18 into discharge pipe 24 at the discharge end 14 of the dryer. Also, introduced into inlet end 12 through duct 28 and flowing parallel to the flow of pellets through drum 10 are hot purge or combustion gases which are introduced from a suitable source, not shown, by blower 26. The hot combustion gases flow in the same general direction as the pellets and above the bed of pellets carrying away the moisture evaporated from the pellets. The purge gas is then discharged from the discharge end 14 through duct 30 and thence to the atmosphere or to another mechanism which may utilize this same gas. Located on pipe 30 is a suitable coupling 32. Heat is supplied to the rotary drum through burners 34, 36, 38, 40, 42 and 44. Burners 34 through 44 are preferably gas-fired burners supplied with gas through common supply line 46 and line 48 leading from a suitable source of natural gas, not shown. As indicated previously, the dryer is divided into two major sections, a constant rate of evaporation section 50 and a falling rate of evaporation section 52, which are arbitrarily separated by the dividing line A of the drawing. As indicated, this is arbitrary division but it does mark a point where a constant rate of evaporation, and hence a constant temperature, radically changes to a straight line declining rate of evaporation, or increasing temperature. It has been found that this line of demarcation, in most carbon black dryers, represents roughly the two-thirds point along the length of the dryer. In other words, the first two-thirds of the length of the dryer is taken up by the initial heat-up zone which is extremely short and a rather elongated constant evaporation-constant temperature section 50 and the final one-third of the dryer comprises the declining evaporation section-increasing temperature section. Thus, in order to measure the temperature at the break in the temperature curve where the evaporation rate rapidly drops (represented by line A in the drawings) a plurality of thermocouples are spaced along the dryer so as to span predetermined point A. In a specific example shown in the drawings thermocouples 54, 56, 58, 60, 62, 64, 66, 68 and 70 are spaced about one foot apart and are mounted so as to be about four to five inches from the exterior shell of the drum. Thus, these thermocouples are in the body or bed of pellets 22 at all times during the drying operation and will measure the temperature in this bed. The thermocouples, as shown, are connected in series addition with one another so that an additive voltage representative of the additive temperature is obtained by spanning a distance of about eight to ten feet. Here any variation in the point at which the break in the temperature curve occurs and any change in the temperature at this point can be determined with reasonably high accuracy, and, as pointed out in the previously mentioned parent application, this measurement can be utilized to control the heat supplied to the dryer. However, in addition to measuring the temperature at this point, a most effective and substantially improved control of the dryer can be effected by also measuring the temperature adjacent the inlet end of the dryer. This temperature may then be added to that measured by the thermocouples spanning the point of break in the temperature curve and the combined temperatures can be utilized to control the heat to the dryer. When the two are additively arranged in this fashion it is to be seen that the thermocouple near the inlet end can detect a rapid or substantial change in the character of material to be dried and its rate of injection and make an initial rough adjustment in the heat to the dryer. Thereafter, when the material to be dried has passed to the temperature break point A, a second or final and more accurate adjustment can be made in accordance with the temperature measured at this point. Specifically, in accordance with the drawing, an even better and more accurate measurement is made by spanning a distance of about two to three feet near the inlet end or upstream end of the dryer with a pair of thermocouples 72 and 74. Thermocouples 72 and 74 are connected in series opposition so that they will produce a differential temperature over a two to three foot span of the bed of carbon black pellets. This differential temperature is then added to the temperatures measured by the first series of thermocouples 54 through 70 and the sum or total is then used to operate temperature recorder controller 76 which in turn operates valve 78 in fuel supply line 48. To take a specific example, if an increased throughput through the dryer occurs the thermocouple pair 72 and 74 would sense a lower temperature gradient or differential temperature and signal through temperature recorder controller 76 for more heat. Now, as the carbon black, which caused this differential temperature change, or the variance of the measured temperature gradient from the predetermined gradient, flows past point A, if the correction made by thermocouples 72 and 74 was not adequate, the thermocouples 54 to 70 would signal a temperature lower than a predetermined value and signal temperature recorder controller 76 for still more heat and thus make a final or micrometer-type adjustment of the heat along the length of the dryer. Using nine thermocouples such as those indicated and using the I–C thermocouples, the EMF range of thermocouples 54 through 70 would be about 4.2 mv., that is from about 62.6 mv. to 66.8 mv. with a control point or predetermined level of 64.7 mv. The first two thermocouples, that is 72 and 74, will measure a difference in temperature of about 30° F. over the distance spanned and this would add approximately 0.85 mv. to the control point of 64.7 thereby resulting in an additive or accumulated voltage of 65.55. Thus, for each degree F. a change in the inlet temperature gradient, an EMF change of 0.09 mv. would occur. A variable resistor 80 is generally needed to adjust the upstream thermocouples' EMF to the optimum value. Without this resistor there would be a tendency for overcontrol of the system.

I claim:

1. A method of controlling the rate of evaporation of moisture from a particle-form carbon black, comprising: continuously flowing an elongated bed of said carbon black along a substantially horizontal path; heating substantially the entire length of said bed to evaporate moisture from said bed; measuring the temperature at a plurality of first points in said bed, spaced along said bed and spanning a predetermined first location along said bed at which a constant rate of evaporation from said bed changes to a falling rate of evaporation; adding the measured temperatures at said plurality of first points to obtain a first sum of the measured temperatures; measuring the temperature at two second points in said bed, spaced along said bed and at a predetermined second location upstream of said first location and upstream of the most upstream one of said plurality of first points; subtracting the temperatures measured at said second points from one another to obtain a differential value of the measured temperatures; adding said differential value of said measured temperatures to the sum of the measured temperatures at said plurality of first points to obtain a second sum of the measured temperatures; comparing said second sum of measured temperatures with a predetermined value of temperature; and adjusting the heat to said bed in accordance with the variance of said second sum of said measured temperatures from said predetermined value of temperature.

2. A method of controlling the rate of evaporation of moisture from a particle-form solid material, comprising: continuously flowing an elongated bed of said particle-form solid along a substantially horizontal path; heating substantially the entire length of said bed to evaporate moisture from said bed; measuring a parameter proportional to the rate of evaporation of moisture from said bed at a plurality of first points in said bed, spaced along said bed and spanning a predetermined first location along said bed at which a constant rate of evaporation from said bed changes to a falling rate of evaporation; adding the measured parameters at said plurality of first points to obtain a first sum of the measured parameters; measuring said parameter at two second points in said bed, spaced along said bed and at a predetermined second location upstream of said first location and upstream of the most upstream one of said plurality of first points; subtracting the parameters measured at said second points from one another to obtain a differential value of the measured parameters; adding said differential value of said measured parameters to the sum of the measured parameters at said plurality of first points to obtain a second sum of the measured parameters; comparing said second sum of measured parameters with a predetermined value of said parameter; and adjusting the heat to said bed in accordance with the variance of said second sum of said measured parameters from said predetermined value of said parameter.

3. A method of controlling the rate of evaporation of moisture from a particle-form solid material, comprising: continuously flowing an elongated bed of said particle-form solid along a substantially horizontal path; heating substantially the entire length of said bed to evaporate moisture from said bed; measuring a parameter proportional to the rate of evaporation of moisture from said bed at a plurality of first points in said bed, spaced along said bed and spanning a predetermined first location along said bed at which a constant rate of evaporation from said bed changes to a falling rate of evaporation; adding the measured parameters at said plurality of first points to obtain a sum of the measured parameters; comparing said sum of the measured parameters with a first predetermined value of said parameter; adjusting the heat to the downstream portion of said bed in accordance with the variance of said sum of the measured parameters from said first predetermined value of said parameter; measuring said parameter at two second points in said bed, spaced along said bed and at a predetermined second location upstream of said first location and upstream of the most upstream one of said plurality of first points; subtracting the parameters measured at said second points from one another to obtain a differential value of the measured parameters; comparing said differential value of the measured parameters with a second predetermined value of said parameter; and adjusting the heat to the upstream portion of said bed in accordance with the variance of said differential value of the measured parameters from said second predetermined value of said parameter.

4. A method of controlling the rate of evaporation of moisture from a particle-form solid material, comprising: continuously flowing an elongated bed of said particle-form solid along a substantially horizontal path; heating substantially the entire length of said bed to evaporate moisture from said bed; measuring a parameter proportional to the rate of evaporation of moisture from said bed at at least one first point in said bed, adjacent a predetermined first location along said bed at which a constant rate of evaporation from said bed changes to a falling rate of evaporation; measuring said parameter at at least one second point in said bed at a predetermined second location upstream of said first location; adding said measured parameter at said second location to said measured parameter at said first location to obtain a sum of the measured parameters; comparing said sum of measured parameters with a predetermined value of said parameter; and adjusting the heat to said bed in accordance with the variance of said sum of said measured parameters from said predetermined value of said parameter.

5. A method in accordance with claim 4 wherein the moisture content of the particle-form solid is between about 0.1 and 1% at the downstream end of the bed.

6. A method in accordance with claim 4 wherein the predetermined first location is about two-thirds of the length of the bed from the upstream end of the bed.

7. A method in accordance with claim 4 wherein the parameter is measured at two spaced points at the predetermined second location.

8. A method in accordance with claim 7 wherein the two points are spaced about two to three feet apart.

9. A method in accordance with claim 4 wherein the parameter measured is temperature.

10. A method of controlling the rate of evaporation of moisture from a particle-form solid material, comprising: continuously flowing an elongated bed of said particle-form solid along a substantially horizontal path; heating substantially the entire length of said bed to evaporate moisture from said bed; measuring a parameter proportional to the rate of evaporation of moisture from said bed at two points in said bed, spaced along said bed and at a predetermined location upstream of a location along said bed at which a constant rate of evaporation from said bed changes to a falling rate of evaporation; subtracting the parameters measured at said points from one another to obtain a differential value of the measured parameters; comparing said differential value of the measured parameters with a predetermined value of said parameter; and adjusting the heat to said bed in accordance with the variance of said differential value of the measured parameters from said predetermined value of said parameter.

11. A method of controlling the rate of evaporation of moisture from a particle-form solid material, comprising: continuously flowing an elongated bed of said particle-form solid along a substantially horizontal path; heating substantially the entire length of said bed to evaporate moisture from said bed; measuring a parameter proportional to the rate of evaporation of moisture from said bed at at least one point in said bed, at a predetermined location upstream of the location along said bed at which a constant rate of evaporation from said bed changes to a falling rate of evaporation; comparing the measured parameter with a predetermined value of said parameter; and adjusting the heat to said bed in accordance with the variance of said measured parameter from said predetermined value of said parameter.

12. A dryer system comprising: an elongated chamber having an inlet and an outlet and adapted to contain a flowing bed of particle-form solid materials; burner means operatively associated with said chamber and adapted to heat said chamber; fuel supply line means operatively connected to said burner; a plurality of first thermocouples mounted within said chamber at spaced points along said chamber, at least a portion of said thermocouples being located in the downstream half of said chamber; said first thermocouples being electrically connected in series addition to provide a first signal representative of the sum of the voltages generated by said first thermocouples; a pair of second thermocouples mounted within said chamber at spaced points along said chamber, upstream from the most upstream one of said first thermocouples; said second thermocouples being electrically connected in series opposition to one another to produce a second signal representative of the difference between the voltages generated by said pair of second thermocouples; said first and said second thermocouples also being electrically connected in series addition to produce a third signal representative of the sum of said first and second signals; valve means mounted in said fuel supply line and adapted to vary the flow of fuel to said burner; and controller means operatively connected to said valve and adapted to open and close said valve in response to the variance of said third signal from a predetermined signal.

13. A system in accordance with claim 12 wherein the first thermocouples span a point about two-thirds of the length of the chamber from the inlet.

14. A system in accordance with claim 12 wherein the first thermocouples are spaced about one foot from one another.

15. A system in accordance with claim 12 wherein the second thermocouples are spaced about two to three feet apart.

16. A dryer system comprising: an elongated chamber having an inlet and an outlet and adapted to contain a flowing bed of particle-form solid materials; burner means operatively associated with said chamber and adapted to heat said chamber; fuel supply line means operatively connected to said burner; a plurality of first temperature sensing means mounted within said chamber at spaced points along said chamber, at least a portion of said temperature sensing means being located in the downstream half of said chamber; said first temperature sensing means being electrically connected to provide a first signal representative of the sum of the temperatures sensed by said first temperature sensing means; a pair of second temperature sensing means mounted within said chamber at spaced points along said chamber, upstream from the most upstream one of said first temperature sensing means; said second temperature sensing means being electrically connected to one another to produce a second signal representative of the difference between the temperatures sensed by said pair of second temperature sensing means; said first and said second temperature sensing means also being electrically connected to produce a third signal representative of the sum of said first and second signals; valve means mounted in said fuel supply line and adapted to vary the flow of fuel to said burner; and controller means operatively connected to said valve and adapted to open and close said valve in response to the variance of said third signal from a predetermined signal.

17. A dryer system comprising: an elongated chamber having an inlet and an outlet and adapted to contain a flowing bed of particle-form solid materials; burner means operatively associated with said chamber and adapted to heat said chamber; fuel supply line means operatively connected to said burner; a pair of thermocouples mounted within the upstream portion of said chamber at spaced points along said chamber; said thermocouples being electrically connected in series opposition to one another to produce a signal representative of the difference between the voltages generated by said pair of thermocouples; valve means mounted in said fuel supply line and adapted to vary the flow of fuel to said burner; and controller means operatively connected to said valve and adapted to open and close said valve in response to the variance of said signal from a predetermined signal.

18. A system in accordance with claim 17 wherein the thermocouples are spaced about two to three feet apart.

References Cited

UNITED STATES PATENTS

| | | | |
|---|---|---|---|
| 3,013,785 | 12/1961 | King | 34—48 X |
| 3,171,639 | 3/1965 | McGregor et al. | 263—34 |
| 3,204,341 | 9/1965 | Whitsel | 34—39 |
| 3,219,329 | 11/1965 | Goins | 263—33 |

KENNETH W. SPRAGUE, *Primary Examiner.*